(12) United States Patent
Solomon et al.

(10) Patent No.: US 7,007,122 B2
(45) Date of Patent: Feb. 28, 2006

(54) METHOD FOR PRE-EMPTIVE ARBITRATION

(75) Inventors: Richard L. Solomon, Colorado Springs, CO (US); Robert E. Ward, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 341 days.

(21) Appl. No.: 10/306,237

(22) Filed: Nov. 27, 2002

(65) Prior Publication Data

US 2004/0117529 A1    Jun. 17, 2004

(51) Int. Cl.
  *G06F 12/00* (2006.01)
  *G06F 13/14* (2006.01)
  *G06F 13/38* (2006.01)

(52) U.S. Cl. ............ 710/240; 710/108; 710/112; 710/113; 710/309; 710/241; 710/242; 710/244

(58) Field of Classification Search ............ 710/108, 710/112–113, 309, 240–244
See application file for complete search history.

(56) References Cited

U.S. PATENT DOCUMENTS

| | | | |
|---|---|---|---|
| 5,129,090 A * | 7/1992 | Bland et al. | 710/114 |
| 5,506,995 A * | 4/1996 | Yoshimoto et al. | 710/107 |
| 5,513,331 A * | 4/1996 | Pawlowski et al. | 711/1 |
| 5,517,650 A * | 5/1996 | Bland et al. | 713/323 |
| 5,555,381 A * | 9/1996 | Ludwig et al. | 710/300 |
| 5,572,734 A * | 11/1996 | Narad et al. | 710/200 |
| 5,619,661 A * | 4/1997 | Crews et al. | 710/119 |
| 5,649,209 A * | 7/1997 | Umetsu et al. | 710/266 |
| 5,737,545 A * | 4/1998 | Wszolek et al. | 710/108 |
| 5,745,732 A | 4/1998 | Cherukuri et al. | |
| 5,790,869 A * | 8/1998 | Melo et al. | 710/240 |
| 5,875,343 A | 2/1999 | Binford et al. | |
| 5,884,095 A * | 3/1999 | Wolford et al. | 710/25 |
| 5,905,876 A | 5/1999 | Pawlowski et al. | |
| 5,991,843 A | 11/1999 | Porterfield et al. | |
| 6,061,754 A | 5/2000 | Cepulis et al. | |

(Continued)

FOREIGN PATENT DOCUMENTS

EP    EP 0486230    5/1992

OTHER PUBLICATIONS

"Micro Channel Architecture for Real-Time Multimedia," Apr. 1, 1995, IBM Technical Disclosure Bulletin, vol. 38, Issue 4, p. 53 538.*

(Continued)

*Primary Examiner*—Tim Vo
*Assistant Examiner*—Donna K. Mason
(74) *Attorney, Agent, or Firm*—Suiter West Swantz PC LLO

(57) ABSTRACT

An interface system capable of providing pre-emptive arbitration among multiple agents comprises an interface including at least a first agent and a second agent which share the interface for transferring data, the second agent having priority over the first agent for access to the interface. A pre-emptive arbiter provides arbitration between the first agent and the second agent when at least one of a first transfer request signal is asserted by the first agent for requesting access to the interface by the first agent and a second transfer request signal is asserted by the second agent for requesting access to the interface by the second agent. The pre-emptive arbiter is capable of synthesizing a transfer completion signal on the interface for preempting access of the first agent to the interface so that access may be granted to the second agent.

26 Claims, 4 Drawing Sheets

U.S. PATENT DOCUMENTS

| | | | |
|---|---|---|---|
| 6,067,071 | A | 5/2000 | Kotha et al. |
| 6,088,740 | A | 7/2000 | Ghaffari et al. |
| 6,178,477 | B1 * | 1/2001 | Jaramillo et al. ............ 710/310 |
| 6,233,628 | B1 | 5/2001 | Salmonsen et al. |
| 6,260,093 | B1 * | 7/2001 | Gehman et al. ............ 710/309 |
| 6,266,778 | B1 | 7/2001 | Bell |
| 6,490,644 | B1 | 12/2002 | Hyde, II et al. |
| 6,529,980 | B1 * | 3/2003 | Abramson ................... 710/108 |
| 6,532,510 | B1 * | 3/2003 | Klein ......................... 710/260 |
| 6,564,271 | B1 | 5/2003 | Micalizzi, Jr. et al. |
| 6,578,096 | B1 | 6/2003 | Steinmetz et al. |
| 6,816,934 | B1 * | 11/2004 | Riley et al. ................. 710/113 |
| 2002/0083256 | A1 | 6/2002 | Pannell |
| 2002/0138679 | A1 * | 9/2002 | Koning et al. .............. 710/244 |
| 2004/0006662 | A1 * | 1/2004 | Frank Chao ................ 710/240 |

OTHER PUBLICATIONS

"High Speed Parallel Bus Arbitration," Oct. 1, 1989, IBM Technical Disclosure Bulletin, vol. 32, Issue 5B, p. 409-411.*

"Multiple Bus Masters with Arbitration and Preempt Capability for Personal Computers, " Sep. 1, 1991, IBM Technical Disclosure Bulletin, vol. 34, No. 4B, p. 16-18.*

* cited by examiner

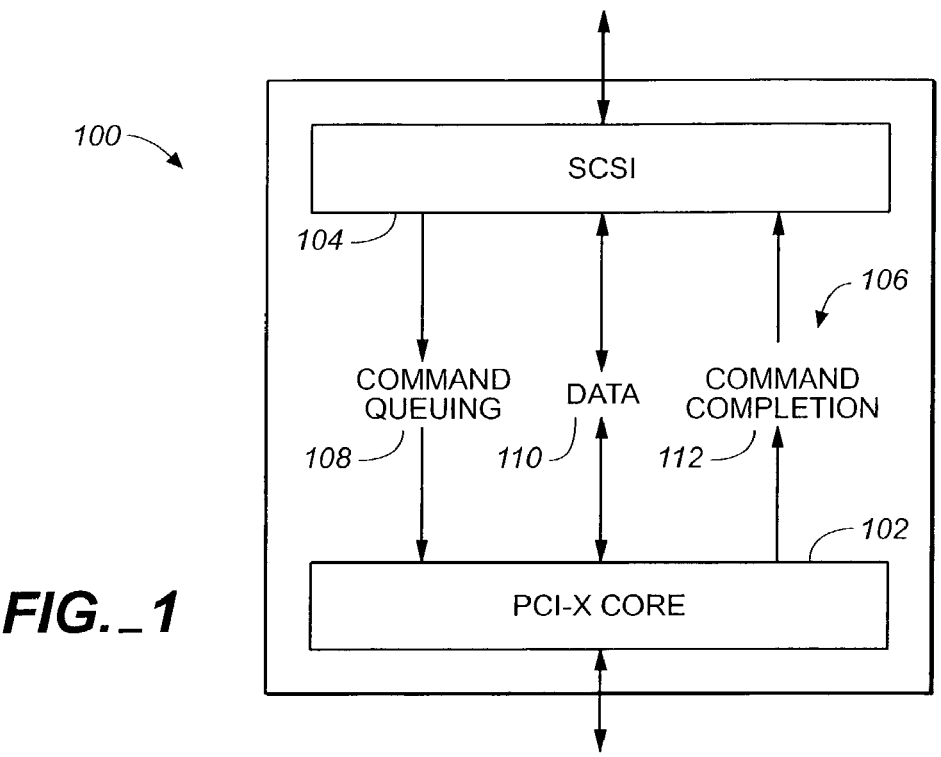
FIG._1
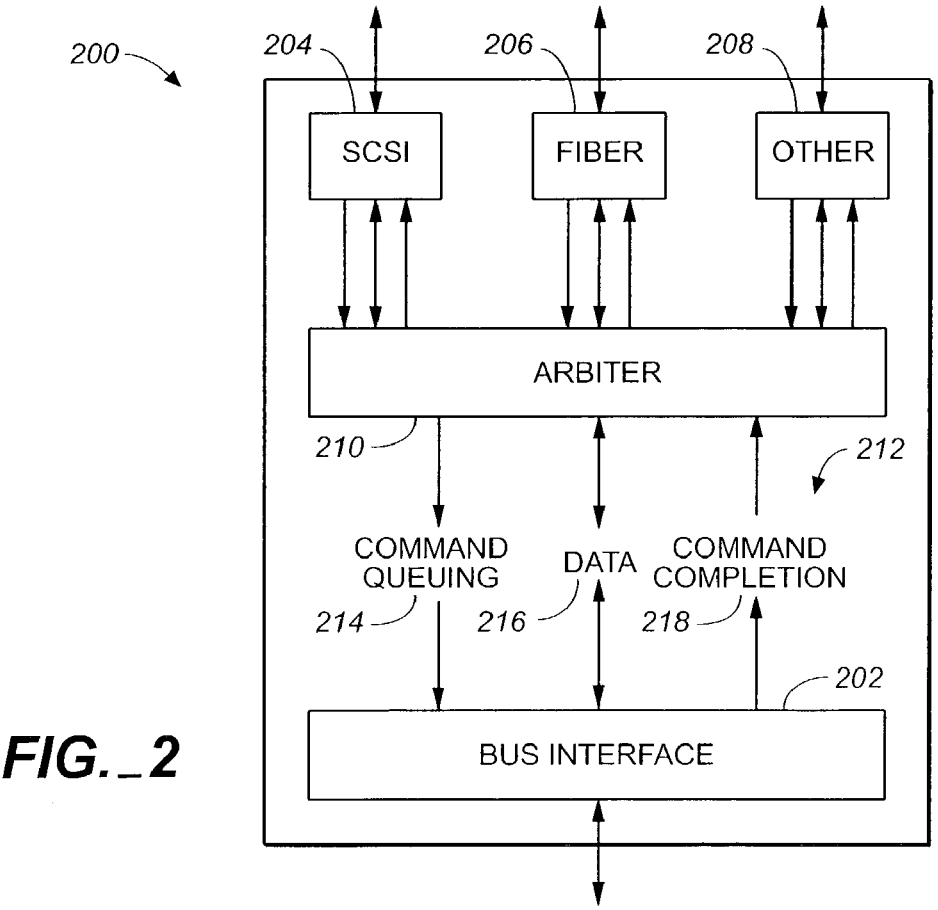
FIG._2

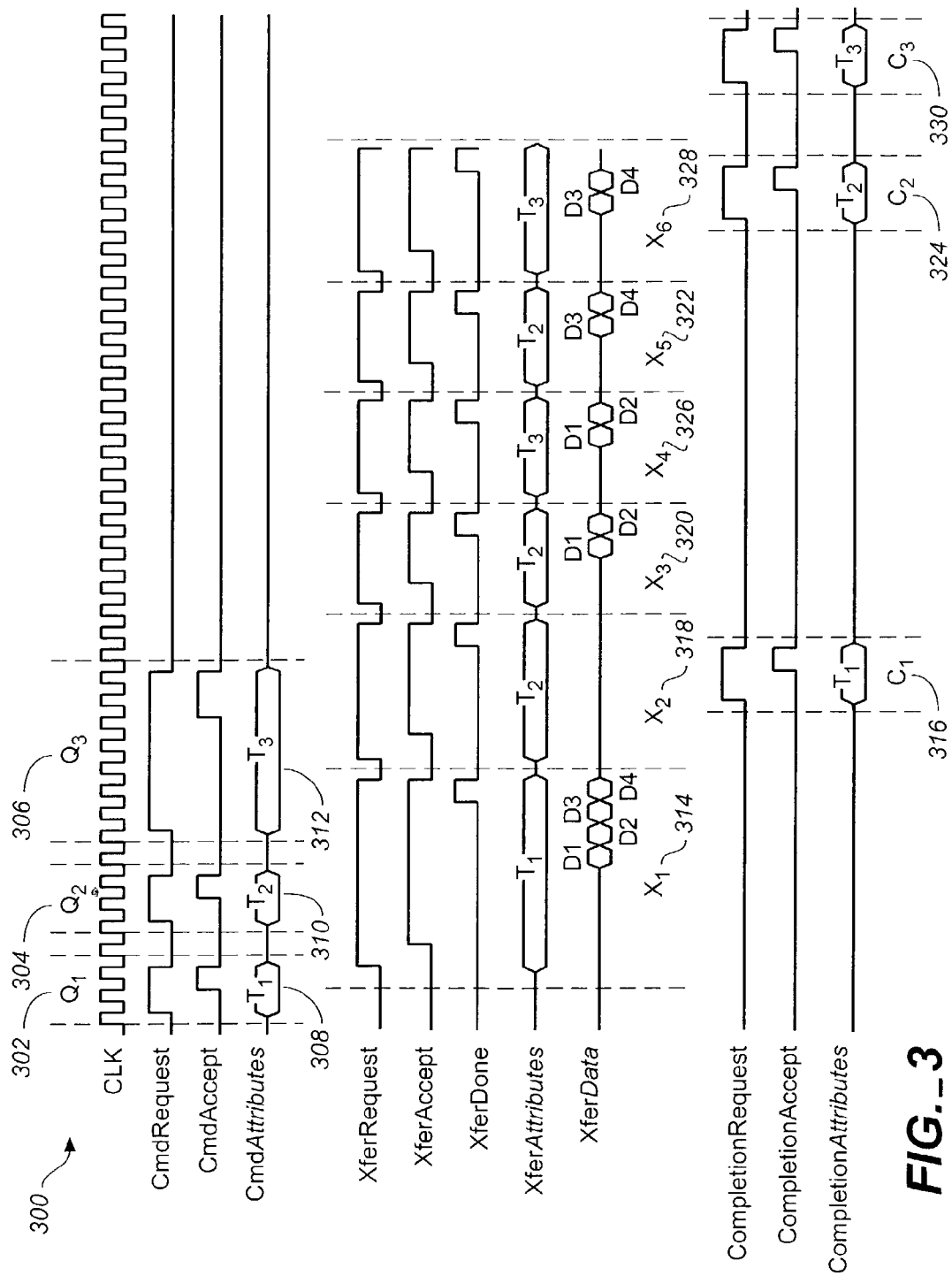
FIG._3

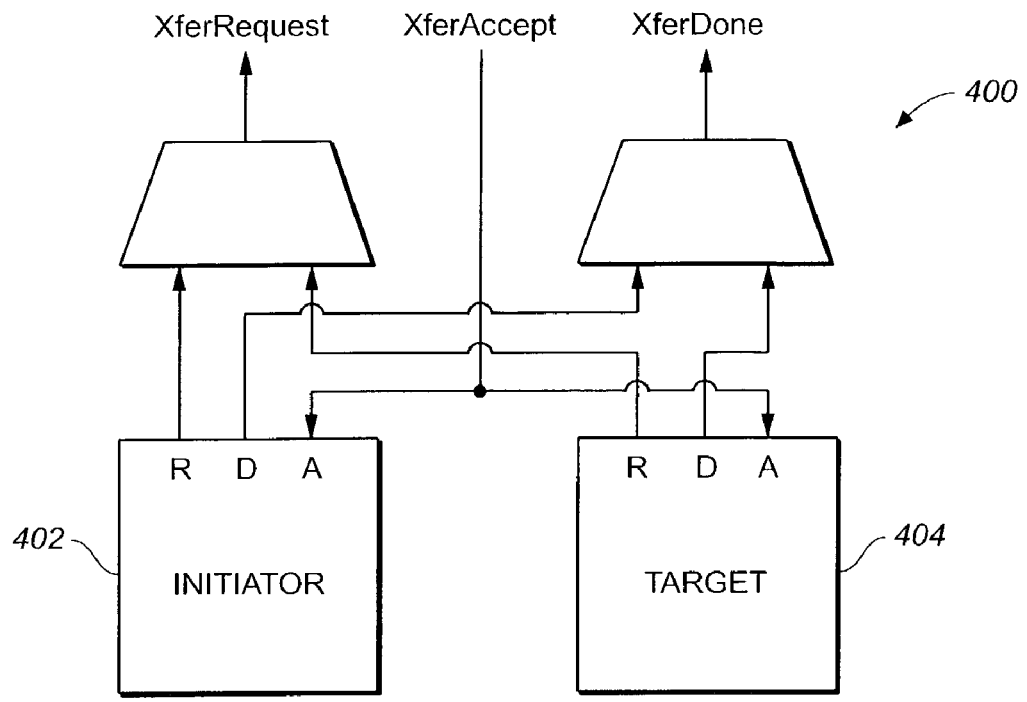
FIG._4
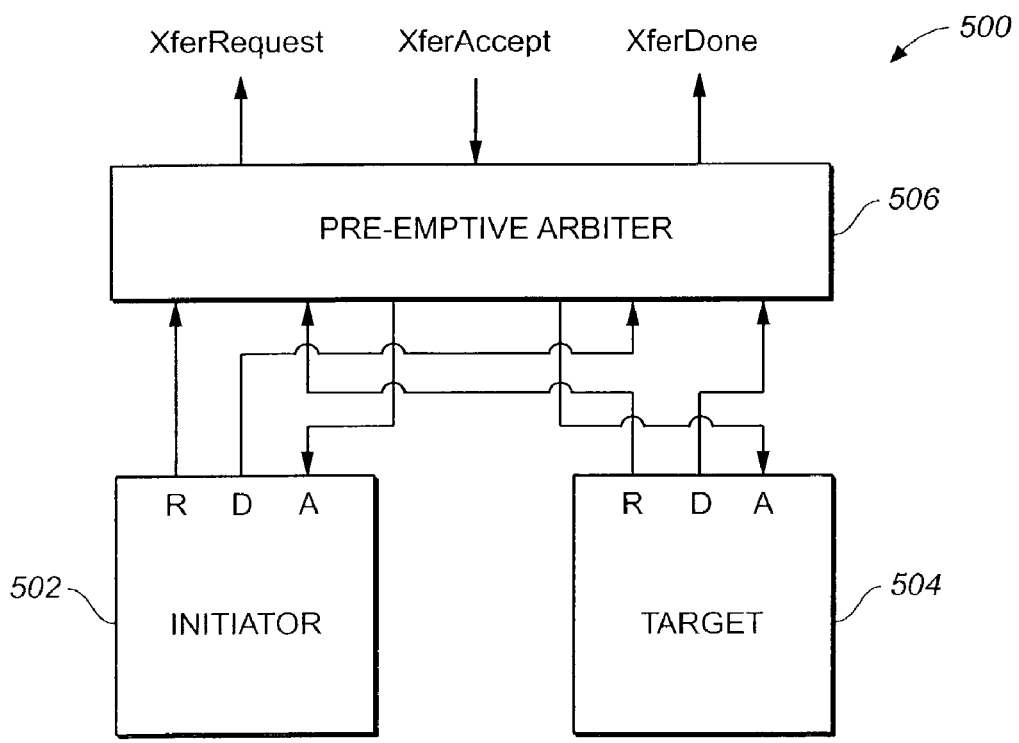
FIG._5

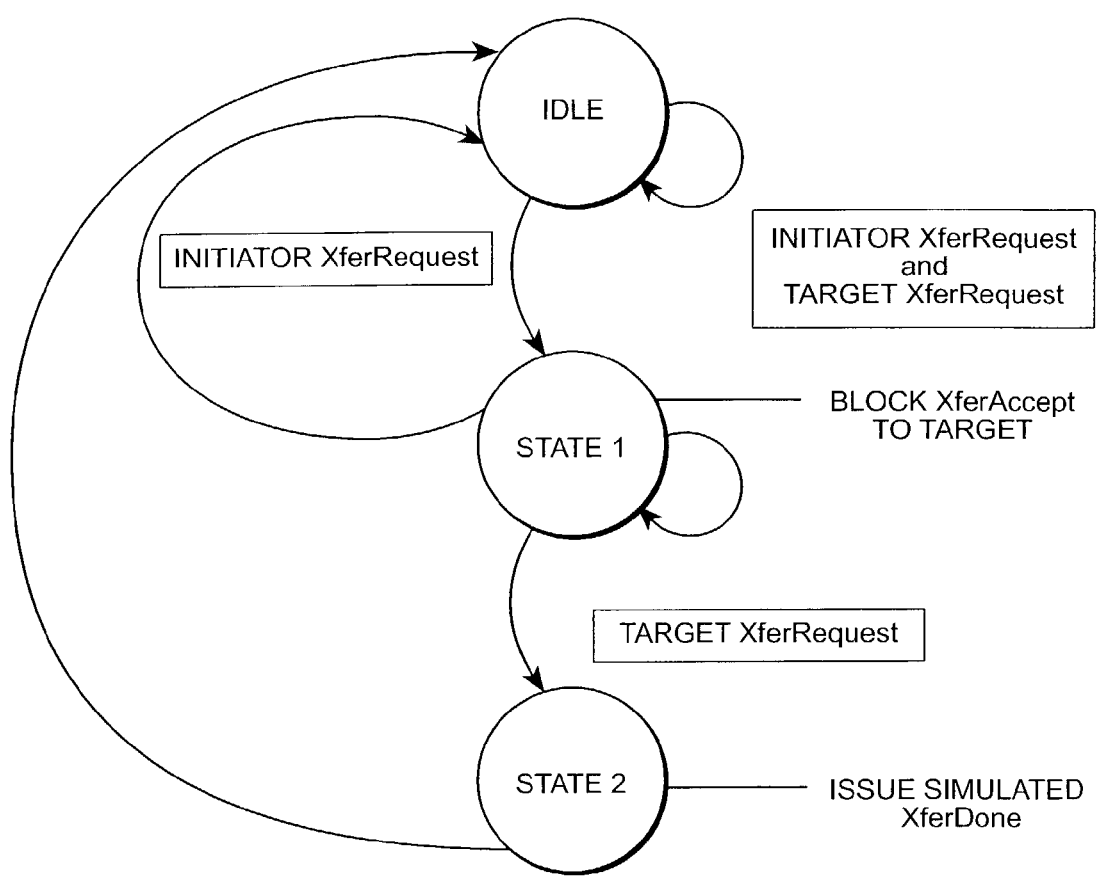
FIG._6

METHOD FOR PRE-EMPTIVE ARBITRATION

FIELD OF THE INVENTION

The present invention generally relates to the field of bus controllers, particularly to an interface for a bus independent core, and more specifically to a method for providing pre-emptive arbitration within such an interface.

BACKGROUND OF THE INVENTION

Information handling systems, such as desktop computers, servers, network appliances, and the like, are driving the expansion of the modern economy. Because information handling systems are performance driven, system throughput is vital for differentiating products, such as products that exchange massive amounts of information, both internally and externally, with storage devices, network interface cards, and the like. Therefore, increases in the ability to transfer data both within the system itself and transfer data over a network may afford competitive advantages for systems able to provide these advances.

One such problem is the transfer of data within the information handling system itself. Due to rapid advancements in processor speed, storage device access times, network speed, and the like, the bandwidth available within the system has steadily eroded. Thus, advancements in the ability of a system to input and output data are at the cutting edge of information handling system development. However, development of faster bus standards has encountered some limitations, namely the dependency of the operations of internal buses to external buses. For example, bus interface controller cores often have internal interfaces, which are tightly tied to the external bus. The internal interfaces may require agents connecting to them to have knowledge of various external bus characteristics, such as disconnection points and byte alignment. Previously, changes in external bus interfaces have required redesign of numerous internal modules. Although attempts have been made at removing external bus dependence from internal interfaces, changes in external bus interfaces typically require redesign of numerous internal modules.

Accordingly, it is advantageous to provide an interface for a bus independent core. However, when multiple agents within such a bus independent core share access to the interface, arbitration priority is ineffective when a high-priority agent makes a request after the shared interface has already been given to another agent. As a result, it would be desirable to provide a method for furnishing pre-emptive arbitration within such an interface.

SUMMARY OF THE INVENTION

The present invention is directed to a method for providing pre-emptive arbitration within an interface system that is shared among multiple agents, wherein one of the agents has a higher priority than the other agents and may require near-immediate access to the shared interface. In an exemplary embodiment, the method includes the steps of asserting at least one of a first transfer request signal from the first agent for requesting access to the interface by the first agent and a second transfer request signal from the second agent for requesting access to the interface by the second agent, the second agent having priority over the first agent for access to the interface and synthesizing a transfer completion signal on the interface for preempting access of the first agent to the interface so that access may be granted to the second agent if the first transfer request is asserted before the second transfer request.

The present invention is also directed to an interface system capable of providing pre-emptive arbitration among multiple agents within the interface. In an exemplary embodiment, the interface system comprises an interface including a first agent and a second agent which share the interface for transferring data, the second agent having priority over the first agent for access to the interface. A pre-emptive arbiter provides arbitration between the first agent and the second agent when at least one of a first transfer request signal is asserted by the first agent for requesting access to the interface by the first agent and a second transfer request signal is asserted by the second agent for requesting access to the interface by the second agent. If, upon assertion of the second transfer request signal, the first agent has access to the interface (e.g., the first transfer request signal was asserted before the second transfer request signal), the pre-emptive arbiter synthesizes a transfer completion signal on the interface for preempting access of the first agent to the interface so that access may be granted to the second agent.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is a block diagram illustrating an interface system includes a command queuing interface, data transfer interface and a command completion interface in accordance with an exemplary embodiment of the present invention, wherein the interface system is capable of employing the method of the present invention;

FIG. 2 is a block diagram illustrating a variety of bus interfaces supported by a multiple bus interface in accordance with an exemplary embodiment of the present invention;

FIG. 3 is an illustration depicting command queuing within a backend device employing an interface of the present invention;

FIG. 4 is a block diagram illustrating a portion of an exemplary data transfer interface such as the data transfer interface 216 within bus interface 202 illustrated in FIG. 2, wherein no pre-emptive arbiter is provided;

FIG. 5 is a block diagram illustrating a portion of an exemplary data transfer interface such as the data transfer interface 216 within bus interface 202 illustrated in FIG. 2, wherein a pre-emptive arbiter in accordance with an exemplary embodiment of the present invention is provided; and FIG. 6 is a state diagram illustrating a method for providing pre-emptive arbitration within an interface in accordance with an exemplary embodiment of the present invention.

DETAILED DESCRIPTION OF THE INVENTION

The present invention provides an interface system capable of providing pre-emptive arbitration among multiple agents within a shared interface. In one embodiment, the interface system comprises an interface having at least two agents, a first agent and a second agent, which share the interface for transferring data, wherein the second agent has priority over the first agent for access to the interface. A pre-emptive arbiter provides arbitration between the first agent and the second agent when at least one of a first transfer request signal is asserted by the first agent for requesting access to the interface by the first agent and a second transfer request signal is asserted by the second agent for requesting access to the interface by the second agent. If the second transfer request signal is asserted before the first transfer request signal or the first transfer request signal and the second transfer request signal are asserted simultaneously, the pre-emptive arbiter blocks the first agent from receiving a transfer acceptance signal. Similarly, if the first transfer request signal is asserted before the second transfer request signal (or no second transfer signal is asserted) the pre-emptive arbiter blocks the second agent from receiving a transfer acceptance signal until the second agent asserts the second transfer request signal. If, upon assertion of the second transfer request signal, the first agent has access to the interface (e.g., the first transfer request signal was asserted before the second transfer request signal), the pre-emptive arbiter synthesizes a transfer completion signal on the interface for preempting access of the first agent to the interface so that access may be granted to the second agent. The pre-emptive arbiter further blocks the first agent from receiving a transfer acceptance signal after receiving the second transfer request signal from the second agent. The pre-emptive arbiter then ceases blocking of the second agent from receiving a transfer acceptance signal. Reference will now be made in detail to the presently preferred embodiments of the invention, examples of which are illustrated in the accompanying drawings.

FIGS. 1 through 3 illustrate interface systems that include a command queuing interface, data transfer interface and a command completion interface in accordance with an exemplary embodiment of the present invention. The interface systems are shown in conjunction with a bus suitable for operation in Peripheral Component Interconnect (PCI) and Peripheral Component Interconnect Extended (PCI-X) architectures. Although, a bus suitable for operation in both conventional PCI and PCI-X modes is described, a wide variety of bus architectures are contemplated without departing from the spirit and scope of the present invention.

Referring now to FIG. 1, a bus interface system 100 in accordance with an exemplary embodiment of the present invention is shown. The bus interface system 100 includes a command queuing interface, data transfer interface and a command completion interface. Typically, bus interface controllers, such as controller cores and the like, have internal interfaces which are tightly tied to an external bus. The internal interfaces may require agents connecting to them to have knowledge of various external bus characteristics, such as disconnection points and byte alignment. Thus, previously, changes in external bus interfaces have required redesign of numerous internal modules. The bus interface of the present invention provides a generic interface that does not require an extensive redesign of numerous internal modules when utilizing a different bus interface controller, thereby greatly increasing the flexibility of the bus interface system.

For example, the bus interface system 100 may include a first bus interface controller, in this instance a PCI-X core 102 coupled to a second bus interface controller, in this instance a SCSI core 104, via an interface 106. The interface 106 includes a command queuing interface 108, a data transfer interface 110 and a command completion interface 112. The command queuing interface 108 enables backend master devices to enqueue transactions. The command completion interface 112 enables a core to report transaction completion. Each exchange on the command completion interface 112 corresponds to a command enqueued on the command queuing interface 108. The data transfer interface 110 may be utilized to move data into (inbound) or out of (outbound) a backend master's buffer. Multiple transfers on the data transfer interface 110 may reference a single transaction queued on the command queuing interface 108. Thus, the command queuing interface 108, command completion interface 112 and data transfer interface 110 provide a decoupled control/data path architecture to a backend master device. Command and control information may be exchanged on the command queuing interface 108 and command completion interface 112 while data is exchanged on the data transfer interface 110. Therefore, data for a given transaction may be moved without respect to transactions being requested on the control bus.

Referring now to FIG. 2, multiple bus interface system 200 in accordance with an exemplary embodiment of the present invention is described. The bus interface system 200 may include a first bus interface 202, such as to a PCI bus, PCI-X bus, and the like, and a variety of additional bus interfaces having interface controllers, such as a SCSI interface controller 204, fiber interface controller 206, or other interface controller 208 as contemplated by a person of ordinary skill in the art. An arbiter 210 is provided for arbitration of commands. For example, the arbiter 210 may resolve competing demands for the interface. This may be accomplished by intercepting the commands from the first bus interface 202 and the variety of other bus interfaces provided having interface controllers 204, 206 and 208. Preferably, only commands are intercepted, since the other data, such as completion and data include ID and tag data.

An interface 212 is included between the arbiter 210 and the first bus interface 202. The interface 212 includes a command queuing interface 214, a data transfer interface 216 and a command completion interface 218. The command queuing interface 214 enables the variety of second interface controllers 204, 206 and 208 to enqueue transactions. The command completion interface 218 enables cores to report transaction completion. Exchanges on the command completion interface 218 correspond to a command enqueued on the command queuing interface 214.

The data transfer interface 216 may be utilized to move data into (inbound) or out of (outbound) a backend master's buffer. Multiple transfers on the data transfer interface 216 may reference a single transaction queued on the command queuing interface 214. Thus, the command queuing interface 214, command completion interface 218 and data transfer interface 216 provide a decoupled control/data path architecture to a backend master device. Command and control information may be exchanged on the command queuing interface 214 and command completion interface 218 while data is exchanged on the data transfer interface 216. Therefore, data for a given transaction may be moved from the second bus interface controller 204, 206 and 208 without respect to transactions being requested by any other controller 204, 206 & 208.

In this way, command queuing and completion are separate from each other and from the data transfer path. Multiple agents may be supported, as well as multiple commands per agent. Data transfers may occur in any order, and have no dependence on possible alignment requirements of the external bus. Commands may also complete in any order.

Referring now to FIG. 3, command queuing within a backend device employing an interface of the present invention 300 is described. Commands shown in FIG. 3 correspond to the exemplary commands shown in the following discussion. In this example, a backend queues up three commands, $Q_1$ 302, $Q_2$ 304, and $Q_3$ 306 with attribute tags $T_1$ 308, $T_2$ 310 and $T_3$ 312. $Q_1$ 302 generates one data transfer cycle, X1 314 to move the data and one completion cycle C1 316 to acknowledge completion of the tag and signal the backend to retire tag T1. $Q_2$ 304 generates three data transfer cycles, $X_2$ 318 reflects a retry on the PCI bus without any data being moved, $X_3$ 320 moves some of the data, $X_5$ 322 moves the remaining data, and one completion cycle, $C_2$ 324 to acknowledge completion of the tag and signal the backend to retire tag $T_2$. $Q_3$ 306 generates two data transfer cycles, $X_4$ 326 moves some of the data, $X_6$ 328 moves the remaining data, and once done, a completion cycle, $C_3$ 330 acknowledges completion of the tag and signals the backend to retire tag $T_3$.

In this way, command queuing and completion are separate from each other and from the data transfer path. Multiple agents may be supported, as well as multiple commands per agent. As shown in FIG. 3, data transfers may occur in any order, and have no dependence on possible alignment requirement of the external bus. Commands may complete in any order. Addresses and counts may be to byte-resolution. Although the use of an interface with respect to a PCI bus has been discussed, it should be readily apparent to a person of ordinary skill in the art that a variety of bus architectures are contemplated by the present invention without departing from the spirit and scope thereof.

The following discussion lists exemplary signals which may be utilized to perform functions utilizing the present invention, an example of which is shown in FIG. 3. Outbound (O) refers to transaction in which data flows from a backend device to the PCI bus, and inbound (I) refers to transaction in which data flows from the PCI bus to a backend device.

Command Queuing Interface

Backend master devices enqueue transactions on this interface. The core will execute one or more transfers on the data transfer interface for each transaction queued on this interface. When the transaction is complete, a single completion status will be reported on the command completion interface.

| | | |
|---|---|---|
| CmdSysAddr[63:0] | I | Address in system memory to/from which the current transaction is directed. |
| CmdLocalAddr[31:0] | I | Address in the backend device's buffer space to/from which the current transaction is directed. |
| CmdLength[23:0] | I | Length of the current transaction. |
| CmdInbound | I | High for transactions moving data from the PCI bus to the backend device. Low for transactions moving data from the backend device to the PCI bus. |
| CmdType[1:0] | I | Identifies the address space for the current transaction: 00 = Memory, 01 = I/O, 10 = Config, 11 = Split Completion. |
| CmdFunctionId[2:0] | I | Identifier which connects transaction to a set of configuration space data. |
| CmdBackendId[3:0] | I | Fixed identifier which is unique to the current backend device. The core uses this to connect transaction data transfers to the correct backend. |
| CmdTag[4:0] | I | Identified which is unique to the current transaction. Must not be reused by the backend until the transaction has been retired. |
| CmdRequest | I | Driven by the backend to indicate that the above signals are stable and represent a desired transaction. |
| CmdAccept | O | Driven by the core to indicate that the transaction has been accepted. |

Command Completion Interface

The core reports transaction completion on this interface. Each exchange on this bus corresponds to a command enqueued on the command queuing interface.

| | | |
|---|---|---|
| CompletionFunctionId[2:0] | O | Identifier corresponding to backend device that requested the transaction which is being retired. |
| CompletionBackendId[3:0] | O | Identifier corresponding to backend device that requested the transaction which is being retired. |
| CompletionTab[4:0] | O | Identifier reporting the CmdTag from the transaction which is being retired. |
| CompletionStatus[1:0] | O | Reports the state of the transaction which is being retired: 00-GOOD-transaction complete without error 01-ERROR-a data error occurred but the transfer continued to completion 10-FAULT-the transaction ended with a fatal error 11-Reserved |
| CompletionRequest | O | Driven by the core to indicate that the above signals reflect a transaction to be retired. |
| CompletionAccept | I | Driven by the backend to indicate that it has retired the referenced transaction. |

Data Transfer Interface

The core uses this bus to move data into (inbound) or out of (outbound) a backend master's buffer. Multiple transfers on this bus may reference a single transaction queued on the command queuing interface.

| | | |
|---|---|---|
| XferLocalAddr[31:0] | O | Address in the backend device's buffer space to/from which the current data transfer is being directed. |
| XferLocalBE[7:0] | O | Active-high byte enables for the XferData busses. |
| XferOutboundData[63:0] | I | The core captures data off this bus for transfers moving data from the backend |

-continued

| | | |
|---|---|---|
| | | device to the PCI bus. (XferInbound is low). |
| XferInboundData[63:0] | O | The core presents data on this bus for transfers moving data from the PCI bus to the backend device. (XferInbound is high). |
| XferInbound | O | High for transfers moving data from the PCI bus to the backend device. Low for transfers moving data from the backend device to the PCI bus. |
| XferFunctionId[2:0] | O | Identifier corresponding to backend device that requested the transaction which generated the current transfer. |
| XferBackendId[3:0] | O | Identifier corresponding to backend device that requested the transaction which generated the current transfer. |
| XferTag[4:0] | O | Identifier reporting the CmdTag from the transaction which generated the current transfer. |
| XferRequest | O | Driven by the core to indicate that the above signals reflect a data transfer in progress. |
| XferAccept | I | Driven by the backend to indicate that it is ready with/for the data transfer indicated by the above signals. |
| XferDone | O | Driven by the core to indicate that the current data transfer is complete. NOTE: This signal alone DOES NOT indicate that the transaction should be retired. |

Referring now to FIG. 4, a portion of an exemplary data transfer interface 400 such as the data transfer interface 216 within bus interface 202 illustrated in FIG. 2, is shown wherein no pre-emptive arbiter is provided. The interface 400 illustrated in FIG. 4 employs a transfer request signal "XferRequest" for indicating that an agent requires access to the shared interface, a transfer accept signal "XferAccept" for indicating to an agent that the agent has the interface, and a transfer completion signal "XferDone" by which the agent indicates its transfer on the interface is being completed. In the embodiment illustrated in FIG. 4, the interface 400 includes two agents, "Initiator" 402 and "Target" 404, which compete for access to the shared interface. However, it will be appreciated that three or more agents may be present. In the embodiment shown, the agent "Target" 404 is the agent which must have priority access to the interface, even if the other agent, "Initiator" 402, has already received a XferAccept signal before it asserts a XferDone signal.

FIG. 5 illustrates an exemplary data transfer interface 500 in accordance with the present invention. Again, in the embodiment illustrated, the interface 500 includes two agents, "Initiator" 502 and "Target" 504, which compete for access to the shared interface. To accommodate the requirement that the Target 504 must have priority access to the shared interface, even if the other agent, Initiator 502, has already received a XferAccept signal before it asserts a XferDone signal, the Initiator 502 is modified to accept the removal of the XferAccept signal before it asserts the XferDone signal, and a pre-emptive arbiter 506 is provided. Preferably, the pre-emptive arbiter 506 is capable of masking the non-granted agent and either passing or synthesizing the XferDone signal. In this manner, arbitration, as shown in FIG. 5, takes place within the interface (e.g, the bus interface 202 shown in FIG. 2).

In the preferred embodiment illustrated in FIGS. 5 and 6, when the Target 502 asserts the XferRequest signal before the Initiator 504, the Initiator 504 is blocked from receiving a XferAccept signal until the Target 502 asserts the Xfer-Done signal. Similarly, when the Initiator 502 and the Target 504 assert the XferRequest signal simultaneously, the Initiator 502 is blocked from receiving the XferAccept signal until the Target 504 asserts the XferDone signal. However, when the Initiator 502 asserts the XferRequest signal before the Target 504, the Target 504 is blocked from receiving a XferAccept signal until the Target 504 asserts the XferRequest signal ("STATE 1"). When the XferRequest signal asserted by the Target 504 is received by the pre-emptive arbiter 506, the pre-emptive arbiter 506 blocks the XferAccept signal to the Initiator 507 and provides a synthesized XferDone signal on the interface. Once the synthesized XferDone signal is generated by the pre-emptive arbiter 506, the pre-emptive arbiter ceases blocking the XferAccept signal so that the XferAccept signal is received by the Target 502 ("STATE 2").

The present invention thus provides for pre-emptive arbitration of a shared interface by synthesizing a transfer completion signal on the interface in order to pre-empt a first or current agent and allow a second agent access to the interface. In this manner, a high priority agent can obtain faster access to a shared interface than would be possible using arbitration priority. The present invention is thus particularly applicable to applications employing PCI-X cores employing a shared interface as described in FIGS. 1 through 3 to provide improved performance of the transfer (Xfer) bus within such applications. However, it is contemplated that the present invention may also be used in other applications employing a shared interface to improve performance.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for providing arbitration for an interface shared by a first agent and a second agent, comprising:
    asserting at least one of a first transfer request signal from the first agent for requesting access to the interface by the first agent and a second transfer request signal from the second agent for requesting access to the interface by the second agent, the second agent having priority over the first agent for access to the interface; and
    synthesizing a transfer completion signal on the interface for preempting access of the first agent to the interface so that access may be granted to the second agent if the first transfer request is asserted before the second transfer request.

2. The method as claimed in claim 1, further comprising blocking the first agent from receiving a transfer acceptance signal if the second transfer request signal is asserted before the first transfer request signal.

3. The method as claimed in claim 1, further comprising blocking the first agent from receiving a transfer acceptance signal if the first transfer request signal and the second transfer request signal are received simultaneously.

4. The method as claimed in claim 1, further comprising blocking the first agent from receiving a transfer acceptance signal after receiving the transfer request signal from the second agent.

5. The method as claimed in claim 1, further comprising blocking the second agent from receiving a transfer acceptance signal after receiving the transfer request signal from the first agent.

6. The method as claimed in claim 5, comprising blocking the second agent from receiving the transfer acceptance signal until the second agent asserts the second transfer request signal.

7. The method as claimed in claim 5, further comprising ceasing blocking of the second agent from receiving a transfer acceptance signal after the transfer completion signal is synthesized.

8. A method for providing arbitration for an interface shared by a first agent and a second agent, comprising:
receiving a first transfer request signal from the first agent; whereupon access to the interface is given to the first agent;
thereafter receiving a second transfer request signal from the second agent, the second agent having priority over the first agent for access to the interface; and
synthesizing a transfer completion signal on the interface for preempting access of the first agent to the interface so that access may be granted to the second agent.

9. The method as claimed in claim 8, further comprising blocking the first agent from receiving a transfer acceptance signal after receiving the transfer request signal from the second agent.

10. The method as claimed in claim 8, further comprising blocking the second agent from receiving a transfer acceptance signal after receiving the transfer request signal from the first agent.

11. The method as claimed in claim 10, comprising blocking the second agent from receiving the transfer acceptance signal until the second agent asserts the second transfer request signal.

12. The method as claimed in claim 10, further comprising ceasing blocking of the second agent from receiving a transfer acceptance after the transfer completion signal is synthesized.

13. An interface system shared by a first agent and a second agent, comprising:
means for receiving at least one of a first transfer request signal from the first agent for requesting access to the interface by the first agent and a second transfer request signal from the second agent for requesting access to the interface by the second agent, the second agent having priority over the first agent for access to the interface; and
means for synthesizing a transfer completion signal on the interface for preempting access of the first agent to the interface so that access may be granted to the second agent if the first transfer request is asserted before the second transfer request.

14. The interface system as claimed in claim 13, further comprising means for blocking the first agent from receiving a transfer acceptance signal if the second transfer request signal is asserted before the first transfer request signal.

15. The interface system as claimed in claim 13, further comprising means for blocking the first agent from receiving a transfer acceptance signal if the first transfer request signal and the second transfer request signal are asserted simultaneously.

16. The interface system as claimed in claim 13, further comprising means for blocking the first agent from receiving a transfer acceptance signal after receiving the transfer request signal from the second agent.

17. The interface system as claimed in claim 13, further comprising means for blocking the second agent from receiving a transfer acceptance signal after receiving the transfer request signal from the first agent.

18. The interface system as claimed in claim 17, comprising means for blocking the second agent from receiving the transfer acceptance signal until the second agent asserts the second transfer request signal.

19. The interface system as claimed in claim 17, further comprising means for ceasing blocking of the second agent from receiving a the transfer acceptance signal after the transfer completion signal is synthesized.

20. An interface system, comprising:
an interface shared by a first agent and a second agent for transferring data, the second agent having priority over the first agent for access to the interface;
a pre-emptive arbiter for providing arbitration between the first agent and the second agent upon receiving at least one of a first transfer request signal from the first agent for requesting access to the interface by the first agent and a second transfer request signal from the second agent for requesting access to the interface by the second agent,
wherein, if upon receiving the second transfer request signal the first agent has access to the interface, the pre-emptive arbiter synthesizes a transfer completion signal on the interface for preempting access of the first agent to the interface so that access may be granted to the second agent.

21. The interface system as claimed in claim 20, wherein the pre-emptive arbiter further blocks the first agent from receiving a transfer acceptance signal if the second transfer request signal is asserted before the first transfer request signal.

22. The interface system as claimed in claim 20, wherein the pre-emptive arbiter further blocks the first agent from receiving a transfer acceptance signal if the first transfer request signal and the second transfer request signal are asserted simultaneously.

23. The interface system as claimed in claim 20, wherein the pre-emptive arbiter further blocks the first agent from receiving a transfer acceptance signal after receiving the second transfer request signal from the second agent.

24. The interface system as claimed in claim 20, wherein the pre-emptive arbiter further blocks the second agent from receiving a transfer acceptance signal after receiving the first transfer request signal from the first agent.

25. The interface system as claimed in claim 20, wherein the pre-emptive arbiter further blocks the second agent from receiving a transfer acceptance signal until the second agent asserts the second transfer request signal.

26. The interface system as claimed in claim 25, wherein the pre-emptive arbiter ceases blocking of the second agent from receiving a transfer acceptance after the transfer completion signal is synthesized.

* * * * *